US009292128B1

(12) United States Patent
Huang

(10) Patent No.: US 9,292,128 B1
(45) Date of Patent: Mar. 22, 2016

(54) TOUCH SCREEN PROTECTOR WITH GLASS AND CONFORMABLE OUTER PERIMETER

(71) Applicant: AEVOE INTERNATIONAL LTD., Tortola (VG)

(72) Inventor: Cheng-Su Huang, New Taipei (TW)

(73) Assignee: AEVOE INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/802,588

(22) Filed: Jul. 17, 2015

Related U.S. Application Data

(60) Provisional application No. 62/120,858, filed on Feb. 25, 2015.

(51) Int. Cl.
*B44C 5/08* (2006.01)
*G06F 3/041* (2006.01)
*G06F 3/044* (2006.01)

(52) U.S. Cl.
CPC .............. *G06F 3/0416* (2013.01); *G06F 3/044* (2013.01); *G06F 2200/1633* (2013.01); *G06F 2200/1634* (2013.01)

(58) Field of Classification Search
CPC .................................................... A61F 13/512
USPC .................................................... 428/38, 188
See application file for complete search history.

(56) References Cited

U.S. PATENT DOCUMENTS

| 3,948,662 | A | 4/1976 | Alston |
| 3,950,580 | A | 4/1976 | Boudet |
| 4,889,754 | A | 12/1989 | Vargas |
| 5,486,883 | A | 1/1996 | Candido |
| 5,668,612 | A | 9/1997 | Hung |
| 6,469,752 | B1 | 10/2002 | Ishikawa |
| 6,536,589 | B2 | 3/2003 | Chang |
| 6,555,235 | B1 | 4/2003 | Aufderheide |
| 6,559,902 | B1 | 5/2003 | Kusuda |
| 6,667,738 | B2 | 12/2003 | Murphy |

(Continued)

FOREIGN PATENT DOCUMENTS

| DE | 19808535 A1 | 9/1999 |
| EP | 1471415 A2 | 10/2004 |

(Continued)

OTHER PUBLICATIONS

Non-Final Office Action mailed Jun. 25, 2014; in U.S. Appl. No. 12/780,443.

(Continued)

*Primary Examiner* — Brent O'Hern
(74) *Attorney, Agent, or Firm* — Novak Druce Connolly Bove + Quigg LLP

(57) ABSTRACT

A touch screen protector for a portable electronic device has a front face that includes a touch screen portion and a declining outer perimeter. The touch screen protector includes: a glass sheet having front and back sides that corresponds in size to the touch screen portion; a conformable perimeter portion that corresponds to the declining outer perimeter of the front face of the portable electronic device; and an adhesive provided along at least a portion of the conformable perimeter portion facing the portable electronic device and having adhesive strength enabling repeated removal and reattachment. The touch screen portion allows a capacitive value on the touch screen portion when touched on the glass sheet.

21 Claims, 7 Drawing Sheets

(56) References Cited

U.S. PATENT DOCUMENTS

| | | |
|---|---|---|
| 6,750,922 B1 | 6/2004 | Benning |
| 6,777,055 B2 | 8/2004 | Janssen |
| 6,800,378 B2 | 10/2004 | Hawa |
| 6,864,882 B2 | 3/2005 | Newton |
| 6,879,319 B2 | 4/2005 | Cok |
| 6,995,976 B2 | 2/2006 | Richardson |
| 7,070,837 B2 | 7/2006 | Ross |
| 7,226,176 B1 | 6/2007 | Huang |
| 7,495,895 B2 | 2/2009 | Carnevali |
| 8,044,942 B1 | 10/2011 | Leonhard |
| 9,061,542 B1 | 6/2015 | Huang |
| 9,063,699 B1 * | 6/2015 | Huang .................. G06F 1/1643 |
| 9,092,195 B1 | 7/2015 | Huang |
| 2002/0101411 A1 | 8/2002 | Chang |
| 2002/0122925 A1 | 9/2002 | Liu et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0227722 A1 | 11/2004 | Friberg et al. |
| 2006/0114245 A1 | 6/2006 | Masters et al. |
| 2007/0181456 A1 | 8/2007 | Kusuda et al. |
| 2007/0212508 A1 | 9/2007 | Mase |
| 2008/0030631 A1 | 2/2008 | Gallagher |
| 2008/0055258 A1 | 3/2008 | Sauers |
| 2010/0026646 A1 | 2/2010 | Xiao et al. |
| 2010/0102197 A1 | 4/2010 | McIntyre |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0279383 A1 | 11/2011 | Wilson et al. |
| 2013/0316112 A1 | 11/2013 | Leonhard et al. |
| 2015/0323961 A1 | 11/2015 | Leonhard et al. |

FOREIGN PATENT DOCUMENTS

| | | |
|---|---|---|
| JP | 2002328613 A | 11/2002 |
| JP | 3181526 U | 2/2013 |
| KR | 20140016562 A | 2/2014 |
| TW | 200700793 A | 1/2007 |
| TW | 201027992 A | 7/2010 |
| WO | 03052678 A1 | 6/2003 |

OTHER PUBLICATIONS

Non-Final Office Action mailed Nov. 29, 2013; in U.S. Appl. No. 13/411,372.

Non-Final Office Action mailed Jan. 16, 2014; in U.S. Appl. No. 14/078,245.

Non-Final Office Action mailed Dec. 23, 2014; in U.S. Appl. No. 14/485,196.

Visor AG—Screen Protector for iPad; http://store.moshimonde.com/ivisor-ag-ipad.html; published 2004-2010 and retrieved Jun. 8, 2011.

Amendment in Response to the Office Action mailed Jul. 12, 2005; in U.S. Appl. No. 10/436,594.

Gaecke, Jake; "Appletell reviews the iVisor AG for iPad", appletell.com Sep. 15, 2010; http://www.appletell.com/ apple/comment/appletell-reviews-ivisor-ag-for-ipad.

iVisor AG-Screen protector for iPad; 100% Bubble Free iVisor AG iPad Screen Protector; http://store.moshimonde.com/ivisor-ag-ipad.html; published 2004-2010 and retrieved on Jun. 8, 2011.

iVisorAG for iPad 2 Black; http://store.moshimonde.com/ivisorage-for-ipad2-black.html; published 2004-2010 and retrieved Jun. 8, 2011.

iVisor AG for iPhone 4 white; http://store.moshimonde.com/ivisor-ag-iphone4-white.html; published 2004-2010 and retrieved Jun. 8, 2011.

iVisor AG for iPhone 4 black; http://store.moshimonde.com/ivisor-ag-iphone4-black.html.; published 2004-10 and retrieved Jun. 8, 2011.

iVisor AG for iPad 2 black; http://store.moshimonde.com/ivisorag-for-ipad2-black.html; published 2004-2010 and retrieved Jun. 8, 2011.

iVisor AG for iPad 2 white; http://store.moshimonde.com/ivisor-for-ipad2-white.html.; published 2004-2010 and retrieved Jun. 8, 2011.

iVisor XT Crystal Clear Protector for iPad; http://store.moshimonde.com/ivisor-xt-ipad.html; published 2004-2010 and retrieved Jun. 8, 2011.

Screen Protectors Incipio Technologies; http://incipiotech.com/tag/screen-protectors; 2008 and retrieved Jun. 8, 2011.

SGP iPhone 4 Screen and Body Protector Set Incredible Shield Series; published 2010; http://www.sgpstore.com/cell-phone/apple-iphone/iphone-4/sgp-iphone-4-screen-body-protector-set-incredible-shield-series.html.

What makes NuShield Screen Protectors Superior; http://www.nushield.com/technology.php. retrieved Jan. 9, 2015.

"Invisible Shield" zagg.com published 2005-2011; http://www.zagg.com/invisibleshield/apple-ipad-2-3g-cases-screen-protectorscovers-skins-shields-1.php.

Machine translation for DE19808535; published Sep. 2, 1999 and retrieved on Jul. 18, 2011.

Machine translation for JP2002328613; published on Nov. 15, 2002.

English abstract for TW200700793; published Jan. 1, 2007 and published Jan. 9, 2015.

Machine translation for TW201027992; published Jul. 16, 2010.

Canadian Office Action mailed Jul. 27, 2015 for Application No. 2,873,216.

Japanese Office Action mailed Nov. 11, 2015; JP Application No. 2015-070870.

English Translation of Japanese Office Action mailed Nov. 11, 2015; JP Application No. 2015-070870.

English Translation of KR20140016562; Published on Feb. 10, 2014; Retrieved from www.espacenet.com on Dec. 11, 2015.

English Computer Translation of JP3181526; Published on Feb. 14, 2013.

* cited by examiner

TOUCH SCREEN PROTECTOR WITH GLASS AND CONFORMABLE OUTER PERIMETER

CROSS-REFERENCE TO RELATED APPLICATION

This application claims benefit of U.S. provisional application Ser. No. 62/120,858 filed Feb. 25, 2015, and entitled "TOUCH SCREEN PROTECTOR WITH GLASS AND CONFORMABLE OUTER PERIMETER" which is hereby incorporated herein by reference in its entirety.

FIELD

The present disclosure relates to a touch screen protector. In particular, the disclosure relates to a touch screen protector for mobile hand held devices.

BACKGROUND

With the ever increasing popularity of touch screen portable electronic devices, a demand for effective touch screen protectors has developed. Several kinds of touch screen protectors are currently available. For example, many touch screen protectors employ polyethylene terephthalate (PET) or some type of transparent plastic to guard and protect the display screen. Additionally, many commercial touch screen protectors have a tendency to trap air bubbles and dust, despite careful application. When in use, touch screen protectors are usually in direct physical contact with the touch screen of an electronic device, either due to static or by the application of adhesives. When screen protectors are removed, diligent cleaning may be needed to restore the touch screen to its original luster.

Furthermore, as a result of market trends, and increasing number of portable electronic devices may have curved edges.

BRIEF DESCRIPTION OF THE DRAWINGS

Implementations of the present application will now be described, by way of example only, with reference to the attached figures, wherein.

DETAILED DESCRIPTION

Figure 1:
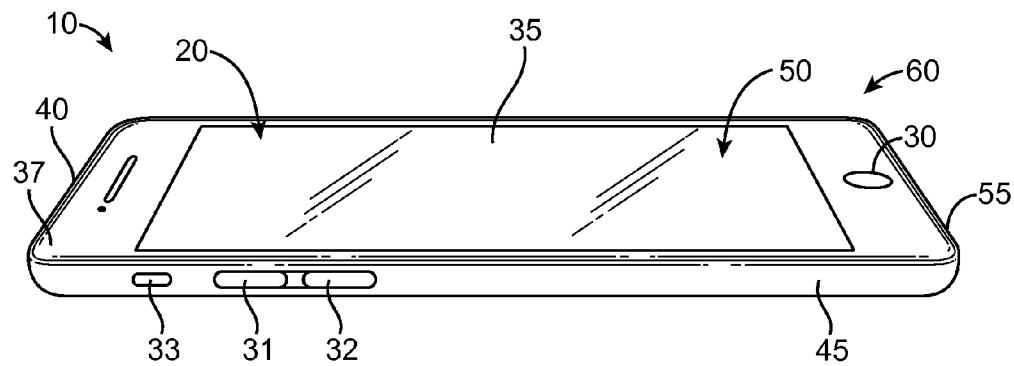
FIG. 1 is a diagram of an exemplary portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without these specific details. In other instances, methods, procedures and components have not been described in detail so as not to obscure the related relevant function being described. This disclosure is not to be considered as limiting the scope of the implementations described herein. It will be understood that descriptions and characterizations of embodiments set forth in this disclosure are not to be considered as mutually exclusive, unless otherwise noted.

The following definitions are used in this disclosure: The term "near" as used herein means close in distance but not in physical contact, for example about or less than 1 mm apart. The term "periphery" as used herein means the outermost part or region within a precise boundary. Accordingly the "peripheral direction" will be understood as extending from the interior toward the exterior outer periphery or edge of an area, such as a glass sheet. The term "touch screen portion" as used herein means the functional portion of the touch screen of the portable electronic device. The term "non-functional band around the perimeter" as used herein means the area surrounding the touch screen portion of the portable electronic device which can be made of a different material or made of the same material as the touch screen but is not touch sensitive. Generally, the term "touch screen" as used herein means a single glass sheet that includes the operable touch screen portion and the non-functional band around the perimeter of the touch screen portion. The touch screen may also include one or more inoperable portions, however, such touch screen will always include an operable touch screen portion. In many recent devices, the touch screen portion makes up the vast majority of the touch screen, with the non-functional band around the perimeter taking up only a small area of the touch screen. The term "front face" of a portable electronic device refers to the top surface which can be seen from an overhead view. The term "anti-static" is used to mean that the glass sheet does not generate static electricity when contacted or rubbed by the user.

A touch screen protector can be used to protect touch screens of many different kinds of portable electronic devices, such as a mobile telephone, reading device, music device, viewing devices, navigation device or other portable electronic devices. Examples of such devices are iPhone, Nook, iPod, iPad, Droid, and GPS navigation systems. The nature of a given touch screen protector and its design enable specific embodiments to be adapted to conform to the touch screen of any such portable electronic device. For example, the shape of the touch screen protector can have corners that are rounded or beveled to match those of the portable electronic devices.

Recently, many portable electronic devices have begun to have a declining or curved edge along the outer perimeter of the front face of the device. This edge can be referred to herein as a beveled, declining, or curved edge. The declining edge refers to a portion which connects the flat portion of the touch screen with a side edge of the device and which is not perpendicular to either. The declining edge portion around the perimeter can be either the touch screen and/or other segments of the front face surrounding the touch screen. In some instances, the touch screen may curve seamlessly to the side edge. In other examples, the touch screen may terminate and another component of the front face of the device may extend to the side edge. One example is shown in FIG. 1, which illustrates a portable electronic device 10 which is sized to be hand held. The portable electronic device 10 can have a touch screen 20. The touch screen 20 has a touch screen portion 35 for operation of the portable electronic device 10 as well as non-functional band 37 around the perimeter 40.

The portable electronic device 10 can also have a general functional button 30 as well as other functional buttons such as volume 31, 32 or mute button 33. Notably, the portable electronic device 10 has a side edge 45 and a front face having flat (or substantially flat) portion 50. The flat portion 50 of the touch screen 20 curves to the side edge 45 via declining portion 55. In other examples, the side edge 45 is itself curved, arc shaped or parabolic, and in any of these instances the extreme end may be considered the side edge 45. The declining portion 55 can be made up of a portion of the touch screen 20. In some instances, prior to the declining portion 55 or along its length the touch screen 20 may terminate and the surface continue as a plastic or metal surface. Accordingly, the front face 60 of the portable electronic device 10 includes both the flat portion 50 and the declining portion 55, the entirety of which may be the touch screen 20, or as noted, may terminate as it extends toward the periphery of the front face 60 and continue as a plastic or metal surface.

In some mobile devices, the non-functional band 37 is omitted, minimized or reduced. In such examples for example, there may be no non-functional band 37 on the lateral sides of the touch screen portion 35 but only above and below the touch screen portion 35. Alternatively, the non-functional band 37 may be absent from above and below the touch screen portion 35, and only present on either lateral side of the touch screen portion 35. Alternatively, the non-functional band 37 is entirely omitted, and the entire touch screen 20 is functional (and thus the touch screen portion 35 is coextended and the same as the touch screen 20). The entire front face 60 can be made up of the touch screen 20, the entirety of which is functional, and considered the "touch screen portion." In each of these cases, the front face still has the declining portion 55.

Figure 2:
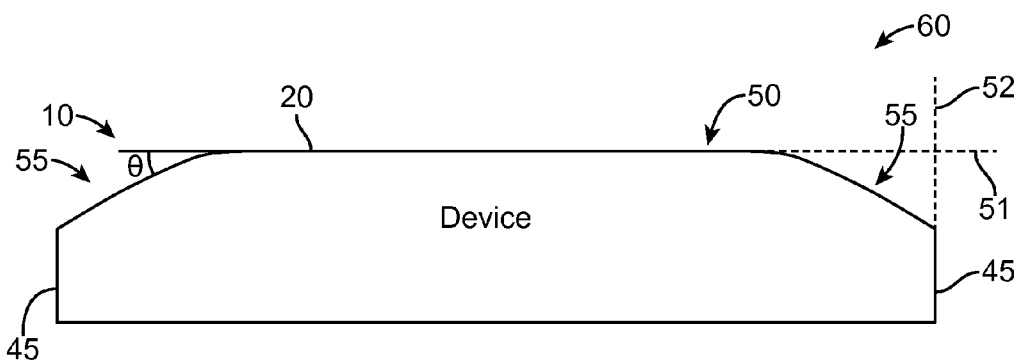
FIG. 2 is a diagram of an exemplary portable electronic device.

In order to illustrate the declining portion 55, a cross-sectional view of portable electronic device 10 is illustrated in FIG. 2 having a front face 60 with a flat portion 50 and an exaggerated declining portion 55. In the illustrated embodiment, the touch screen 20 extends across the front face 60 to also include the flat portion 50 and declining portion 55. The flat portion 50 extends horizontally within horizontal plane 51. Additionally, the side edge 45 extends within vertical plane 52. As shown, the declining portion 55 declines from the flat portion 50 to the side edge 45. Accordingly, the declining portion 55 can be described as a ramped decline from the flat portion 50. The declining portion 55 is not perpendicular with either the flat portion 50 or the on either side (the declining portion 55). The declining portion 55 in FIG. 2 is shown as slightly curved as it extends from the flat portion 50 to the side edge 45. As shown, the declining portion declines at angle θ from the flat portion 50 to side edge 45. The declining portion 55 may be straight, concave or otherwise curved. The declining portion 55 may also be considered as the portion of the front face 60 which curves away from the flat portion 50 around the periphery of the front face 60 of the portable electronic device 10.

Figure 2A:
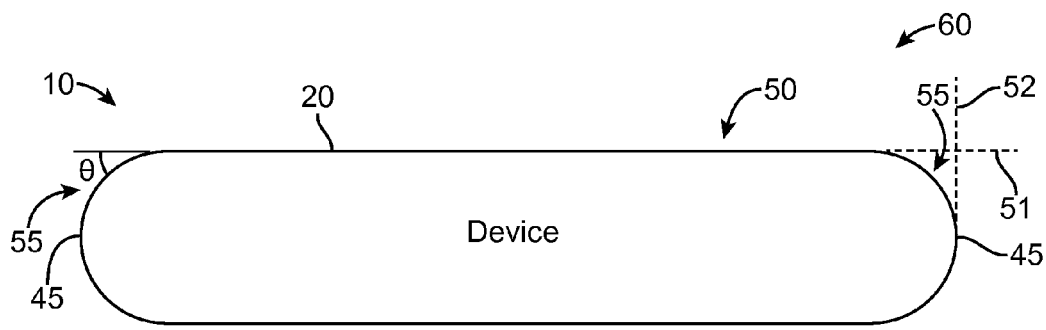
FIG. 2A is a diagram of an exemplary portable electronic device.

As described above, the side edge 45 itself can be curved. For example as shown in FIG. 2A, the side edge 45 itself is curved. In such a case, the extreme side end can be considered to be side edge 45 which the declining portion 55 curves from, while curving toward the flat portion 50. Accordingly, the front face 60 has declining portion 55 which declines to side edge 45.

A touch screen protector 100 as disclosed herein can be employed to protect the touch screen portion 35 of the portable electronic device 10. However, glass is generally planar (or slightly convex when oriented properly on the device) and thus cannot generally bend to accommodate the declining portions of portable electronic devices. As further described herein, a touch screen protector 100 can have a conformable perimeter portion 106 which can essentially conform to the non-functional band 37 that surrounds the touch screen portion 35 of the portable electronic device 10.

Figure 3:
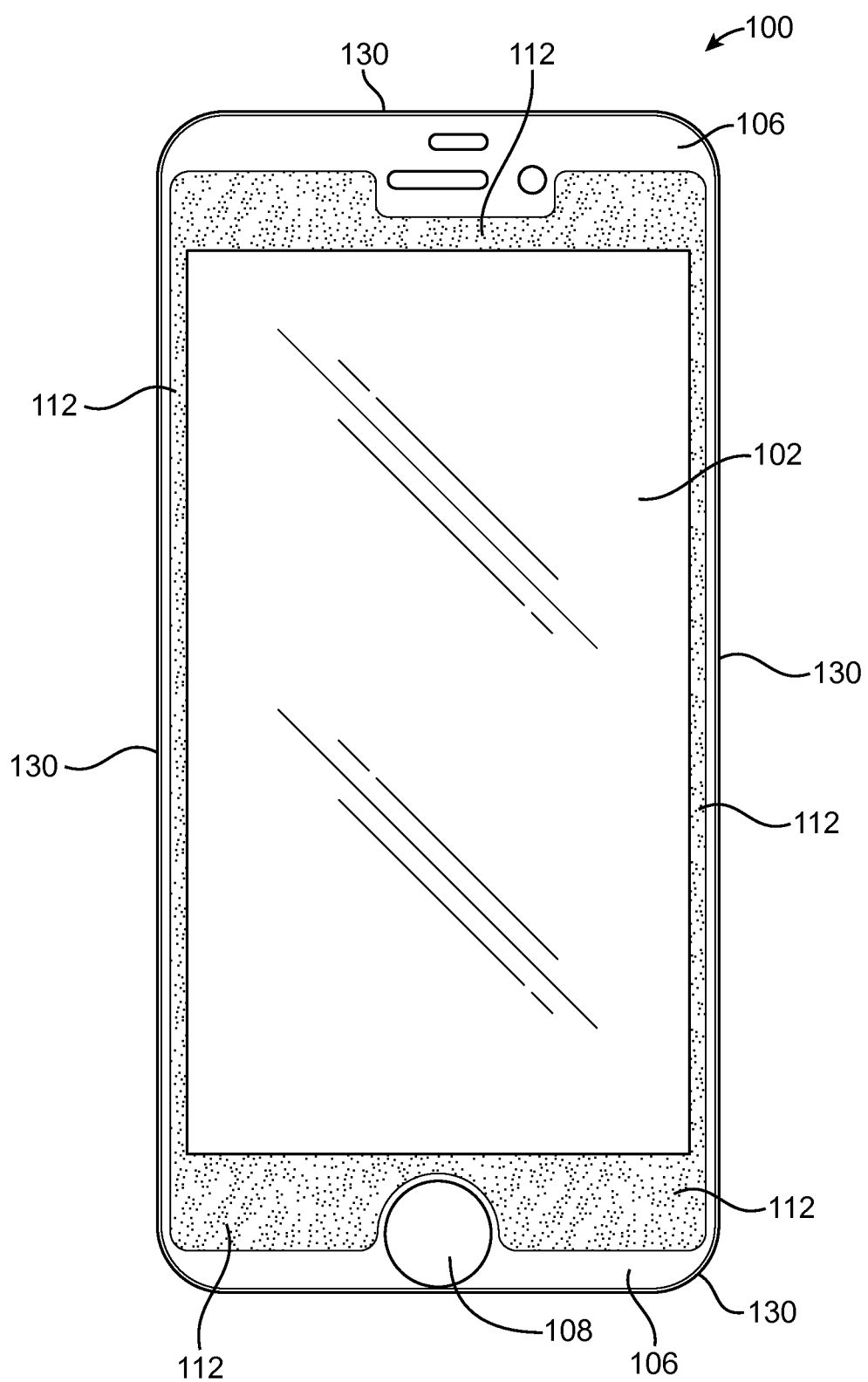
FIG. 3 is a diagram of one exemplary of a touch screen protector according to the disclosure herein.

A top view of the underside of a touch screen protector 100 in accordance with an exemplary embodiment is illustrated in FIG. 3. As shown, the touch screen protector 100 can correspond to the shape of a portable electronic device 10, and thus can be generally rectangular. However, the shape of the touch screen protector 100 is not limited to only generally rectangular shapes, but can be rounded or have other polygonal shape to correspond to the shape of a desired device and touch screen. The touch screen protector 100 can include a glass sheet 102 and a conformable perimeter portion 106. The touch screen protector 100 can be shaped and have dimensions that substantially correspond to the shape and dimensions of a front face of a portable electronic device 10. The glass sheet 102 can substantially correspond to the touch screen portion 35 (shown in FIG. 1) of the portable electronic device 10. In at least one embodiment, the glass sheet 102 can extend further than the touch screen portion 35 of the portable electronic device 10 but still allow access to the touch screen portion 35 of the portable electronic device 10. The light transmission of the glass sheet 102 can be from about 60% to about 99%, alternatively from about 90% to about 99%. The conformable perimeter portion 106 can be opaque or non-opaque.

The conformable perimeter portion 106 can essentially conform to the non-functional band 37 (shown in FIG. 1) that surrounds the touch screen portion. The conformable perimeter portion 106 can be coupled to the outer perimeter of the glass sheet 102. The conformable perimeter portion 106 can substantially surround the glass sheet 102. The conformable perimeter portion 106 can include one or more holes 108 corresponding to one or more buttons of the portable electronic device 10. For example, as shown in FIG. 1, the conformable perimeter portion 106 can have a hole 108 that corresponds to the home button of an iPhone or iPad. By exposing the buttons for ease of operation, the one or more holes 108 can act as alignment features to facilitate proper mounting of the touch screen protector 100 on the portable electronic device. In some portable electronic devices 10, the non-functional band 37 surrounding the touch screen portion can be minimized, or reduced. Accordingly, in some examples, the conformable perimeter portion 106 can be provided only along the outer perimeter of the glass sheet 102 to help hide bubbles in the adhesive 112 and conform to the declining portion 55 of the portable electronic device 10.

The conformable perimeter portion 106 can be made of a metal, for example aluminum, steel or other metal. In other examples, the conformable perimeter portion 106 can be made of plastic, silicone, acrylic, carbon fiber, composites, or other suitable material. In yet other examples, the conformable perimeter portion 106 can be made of any suitable material that can be molded to conform to the declining portion 55 of the portable electronic device 10. In yet other examples, the conformable perimeter portion 106 can be made of any rigid material other than glass.

The glass sheet 102 can be sufficiently hard or stiff to prevent the glass sheet 102 from bending or collapsing under its own weight and/or to avoid the glass sheet 102 being pressed against the touch screen portion 35 when pressure is applied to the glass sheet 102 during normal use. For example, when pressure is applied to the glass sheet 102, the glass sheet 102 may flex but should not contact the touch screen portion 35 when a reasonable amount of pressure is applied to the glass sheet 102. To accomplish this, the glass sheet 102 can be sufficiently thin and have sufficient elasticity to withstand excessive pressure, for example, excessive pressure to cause the glass sheet 102 to flex and contact the touch screen portion 35. The hardness of the glass sheet 102 can be between from 6 to about 9, alternatively from about 7 to about 9, as determined by Mohs scale of hardness values. In some embodiments, the hardness of the glass sheet 102 can be more or less than about 6 and about 9 on the Mohs scale of hardness values.

The glass sheet 102 can be made of any suitable transparent material. The glass sheet 102 can be silica based. In some embodiments, the glass sheet 102 can be soda-lime glass, lead glass, flint glass, sodium borosilicate glass, oxide glass or any other suitable transparent material. In some embodiments, the glass sheet 102 can be made of Willow Glass™ by Corning Inc. of Corning, N.Y.

Figure 4:
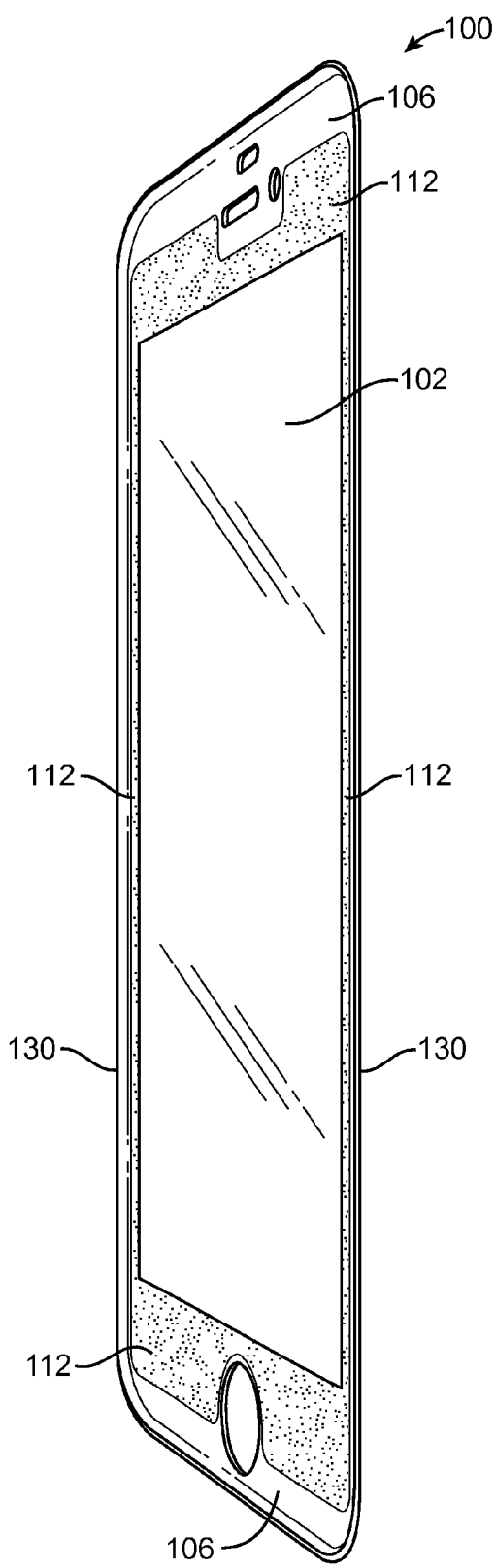
FIG. 4 is a diagram of one example of a touch screen according to the disclosure herein.

FIG. 4 illustrates an isometric view of the underside of one example of a touch screen protector 100. The thickness of the glass sheet 102 can be in the range of about 0.1 mm to 1.0 mm, or alternatively, 0.1 mm to 0.6 mm. The glass sheet 102 can be coupled to the conformable perimeter portion 106. The conformable perimeter portion 106 can essentially correspond to the non-functional band 37 (shown in FIG. 1) that surrounds the touch screen portion 35 (shown in FIG. 1) of portable electronic device 10 (show in FIG. 1). In at least one embodiment, an anti-shatter membrane can be adhered to the underside of the glass sheet 102. The anti-shatter membrane prevents the glass sheet 102 from shattering, and if the glass sheet 102 shatters, the anti-shatter membrane aids in preventing the glass sheet 102 from breaking into smaller scattered pieces which can endanger the fingers of a user. The anti-shatter membrane can be made up of a transparent flexible polymeric material such as PET or other suitable material. The anti-shatter membrane can be adhered to the glass sheet 102 by a strong adhesive, for example an optical grade acrylic adhesive. The anti-shatter membrane can be from 0.05 to 0.25 mm, alternatively from 0.1 to 0.2 mm in thickness. Even with an anti-shatter membrane, the glass sheet 102 does not contact the touch screen portion 35 unless a force is applied.

The glass sheet 102 can be compressed to cause the glass to be one or more of strengthened, tempered, and convex. As described above, the glass sheet 102 is generally planar. However, due to the strengthening process, the glass can become slightly curved (e.g. convex when placed over a touch screen as disclosed herein). However, because this is a slight effect, the glass sheets 102 can be considered generally planar for practical purposes herein. For example, the glass sheet 102 can become convex by applying different amounts of pressure when the glass sheet 102 is compressed. The glass sheet 102 can be convex with respect to the touch screen portion 35 of the portable electronic device 10 when the touch screen protector 100 is adhered to the portable electronic device 10. When glass sheet 102 is convex, the glass sheet 102 can assist in preventing or avoiding the generation of interference fringes (also referred to as Newton Rings, or interference patterns) when the touch screen protector 100 has no force being applied and/or when normal pressure is applied to the glass sheet 102. The touch screen protector 100 does not contact the touch screen portion 35 unless excessive force is applied to the glass sheet 102. As a result, the glass touch screen protector 100 can assist in preventing or avoiding the generation of interference fringes during normal use.

In at least one embodiment, the touch screen protector 100 can further include a backing member (not shown) to protect an underside of the touch screen protector 100 and the adhesive 112. The back side of the touch screen protector 100 is the side that is closest to the portable electronic device 10 when the touch screen protector 100 is adhered to the portable electronic device 10. The backing member can include a tab to assist in the removal of the backing member prior to mounting the touch screen protector 100 onto the portable electronic device 10. By grasping and pulling on the tab, the backing member can be removed completely from the touch screen protector 100 thereby exposing the adhesive 112 prior to mounting the touch screen protector 100 to the non-functional band 37 of the touch screen portion 35 of the portable electronic device 10. The backing member can include a surface which permits adherence of the backing member to the underside of the touch screen protector 100 as well as easy removal, and can optionally have adhesive thereon. There are various adhesives as described herein that are commercially available, and a skilled artisan can select the particular adhesive for adhering the backing member to the underside of the touch screen protector 100. The adhesiveness of any adhesive on surface can be weaker than the adhesive 112 on the touch screen protector 100.

Referring to FIGS. 3 and 4, the conformable perimeter portion 106 can include a declining perimeter 130. The declining perimeter 130 curves from the flat portion of the conformable perimeter portion 106 to the outside edges of the conformable perimeter portion 106. The declining perimeter 130 can be described as a ramped decline from the flat portion. The declining perimeter 130 can be straight, concave or otherwise curved. The declining perimeter 130 can also be considered as the portion of the touch screen protector 100 which curves away from the flat portion which can include the glass sheet 102 toward the periphery. The declining perimeter 130 declines at an angle that corresponds to the angle θ (shown in FIG. 2) of the declining portion 55 of the portable electronic device 10. For example, due to the perspective illustrated in FIG. 4, the external periphery of the conformable perimeter portion 106 as shown in the figure can be seen extending leftward from the flat plane of the touch screen protector 100 thus forming a curved wall surrounding the internal portions of the touch screen protector 100. The declining perimeter 130 can also be described as the external periphery of the conformable perimeter portion 106 extending toward the underside of the touch screen protector 100.

The touch screen protector 100 can be adhered to the portable electronic device 10 by an adhesive 112. The adhesive 112 can be provided on the underside of the touch screen protector 100. In at least one embodiment, the adhesive 112 can be provided only on the conformable perimeter portion 106, and there is no adhesive on the glass sheet 102. In other embodiments, the adhesive 112 can be provided only on the glass sheet 102. In yet other embodiments, the adhesive 112 can be provided on both the glass sheet 102 and the conformable perimeter portion 106. The outer surface of the adhesive 112 is exposed in order to adhere the touch screen protector 100 to a portable electronic device and so adhesive 112 can be referred to as an exposed adhesive. The adhesive 112 can be made up of one layer or a plurality of layers of adhesive, wherein the outermost surface or layer can be considered an exposed adhesive.

FIGS. 5-8A illustrate different embodiments of the touch screen protector 100 conforming to the portable electronic device 10. The declining perimeter 130 of the touch screen protector 100 declines at the same angle and form as the declining portion 55 of the portable electronic device 10. The following embodiments are only exemplary embodiments and are not limited to the embodiments illustrated herein.

Figure 5:
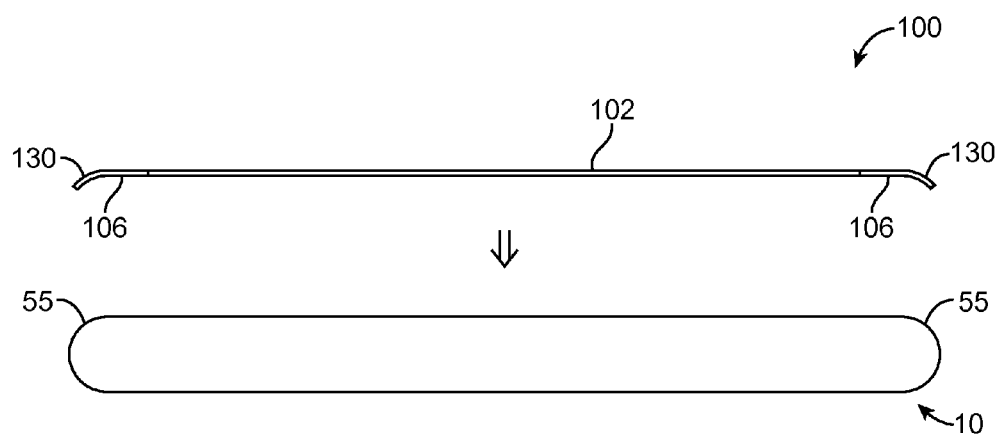
FIG. 5 is a diagram of one example of a touch screen protector for a portable electronic device according to the disclosure herein.
Figure 5A:
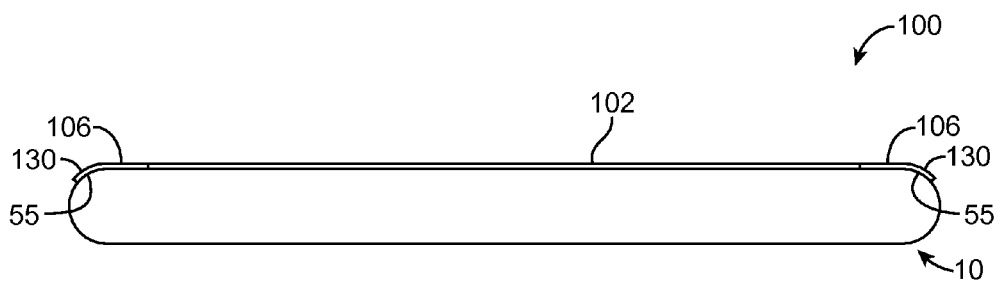
FIG. 5A is a diagram of one example of a touch screen protector for a portable electronic device according to the disclosure herein.

In FIGS. 5 and 5A, the conformable perimeter portion 106 of a touch screen protector 100 is molded such that declining perimeter 130 of the touch screen protector 100 corresponds to the declining portion 55 of the portable electronic device 10. In FIGS. 5 and 5A, the touch screen protector 100 does not have a spacer. As such, substantially the entire touch screen protector 100, including the glass sheet 102, contacts the portable electronic device 10. An adhesive can be provided across the entire undersurface, or a portion thereof, to adhere the touch screen protector 100 to the portable electronic device 10.

Figure 6:
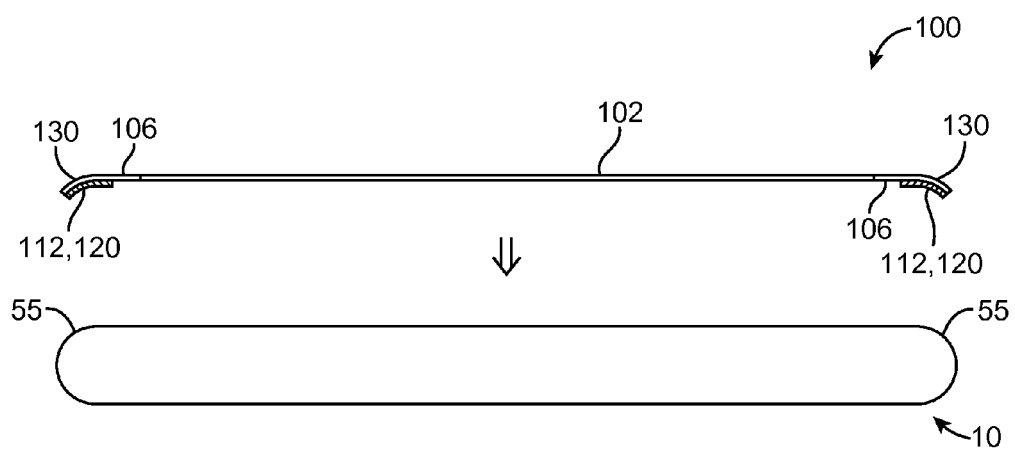
FIG. 6 is a diagram of one example of a touch screen protector for a portable electronic device according to the disclosure herein.
Figure 6A:
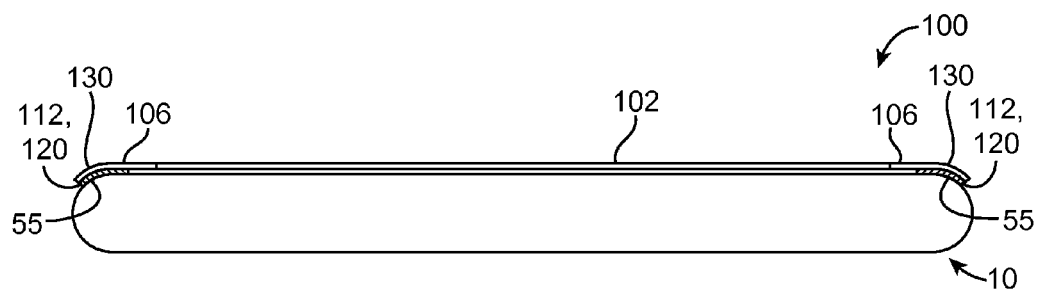
FIG. 6A is a diagram of one example of a touch screen protector for a portable electronic device according to the disclosure herein.

FIGS. 6 and 6A illustrate a touch screen protector 100 with a spacer 120 conforming to a portable electronic device 10. The touch screen protector 100 can be adhered to a portable electronic device 10 by means of a spacer 120. The width of the spacer 120 can be the same as or less than conformable perimeter portion 106 and/or the non-functional portion of the portable electronic device 10. The width of the spacer 120 is selected to conform to or be within the conformable perimeter portion 106 so that the spacer 120 does not interfere with the use of the touch screen portion when the protector is adhesively mounted onto the portable electronic device 10. When the conformable perimeter portion 106 is opaque and when the width of the spacer 120 substantially corresponds to the width of the conformable perimeter portion 106, the spacer 120 can be substantially hidden from a direct top view when the touch screen protector 100 is adhered to a portable electronic device 10. As noted, some portable electronic devices 10 may have the entire front face as functional, and so may not have a non-functional band 37, or a minimized portion. The width of the spacer 120 can be provided to sufficiently support the touch screen protector 100 and space it from the touch screen portion 35. The conformable perimeter portion 106 can be omitted or provided as the same width as the spacer 120 to hide the spacer 120 from a direct top view.

The spacer 120 can have sufficient thickness to space the glass sheet 102 near but not in contact with the touch screen portion of the portable electronic device. The spacer 120 adheres to the underside of the conformable perimeter portion 106 to space the glass sheet 102 (and any layers on its underside) from about 0.01 mm to 0.2 mm from the touch screen portion 35 (shown in FIG. 1) of the portable electronic device 10, and alternatively less than 1.0 mm from the touch screen portion 35. Further, the distance between the glass sheet 102 and the touch screen portion 35 is small enough to allow a capacitive value on the touch screen portion 35 when touched on the glass sheet 102.

The thickness of the spacer 120 varies corresponding to the arrangement of the glass sheet 102. In at least one embodiment, the glass sheet 102 can be substantially aligned with the conformable perimeter portion 106. In other embodiments, the glass sheet 102 can be configured to extend below the conformable perimeter portion 106. In yet other embodiments, the glass sheet 102 can be thinner than the conformable perimeter portion 106. If the configuration of the glass sheet 102 and the conformable perimeter portion 106 allows for the glass sheet 102 to be sufficiently spaced from the touch screen portion 35, a spacer 120 can be omitted.

The spacer 120 can be an adhesive, and may be the same or different adhesive as adhesive 112. The spacer 120 can be a single layer or plurality of layers of adhesive and may include an elastomer or adhesive and non-adhesive components.

Figure 7:
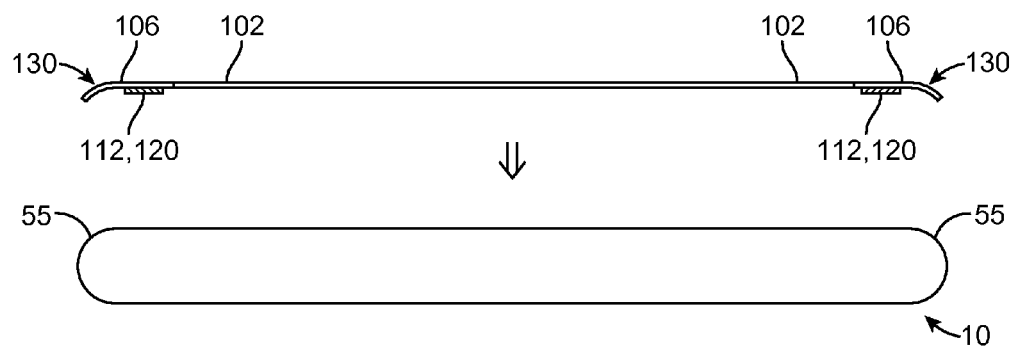
FIG. 7 is a diagram of one example of a touch screen protector for a portable electronic device according to the disclosure herein.
Figure 7A:
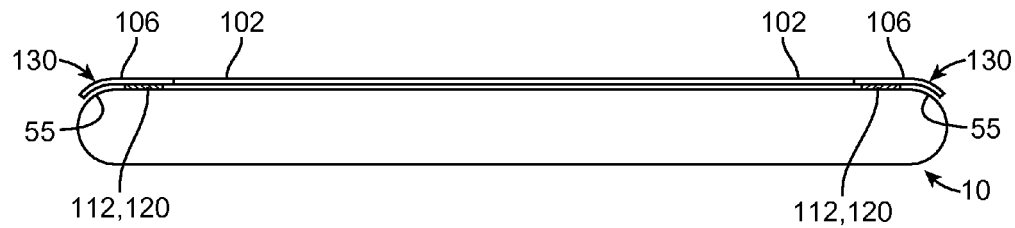
FIG. 7A is a diagram of one example of a touch screen protector for a portable electronic device according to the disclosure herein.

Referring to FIGS. 6 and 6A, the spacer 120 can be located on the declining perimeter 130 as well as the flat portion of the conformable perimeter portion 106. The spacer 120 can be shaped to correspond to the angle of decline of the declining perimeter 130 such that the conformable perimeter portion 106 still conforms to the shape of the portable electronic device 10. In at least one embodiment, the spacer 120 can be solely located on the declining perimeter 130 of the conformable perimeter portion 106. Referring to FIGS. 7 and 7A, the spacer 120 can be located solely on the flat portion of the conformable perimeter portion 106.

The touch screen protector 100 can be adhered to the portable electronic device by an adhesive 112. The adhesive 112 can be provided on the underside of the touch screen protector 100. In at least one embodiment, the adhesive 112 can be provided along the conformable perimeter portion 106. In other embodiments, the adhesive 112 can serve as an exposed adhesive along the spacer. In yet other embodiments, the adhesive 112 can function as a spacer 120 as well as an adhesive 112. The adhesive 112 can have sufficient adhesiveness to mount the touch screen protector 100 to a portable electronic device 10 multiple times for repeated removal and re-attachment, and enables the removal of the touch screen protector 100 without leaving adhesive residue on the portable electronic device 10.

Figure 8:
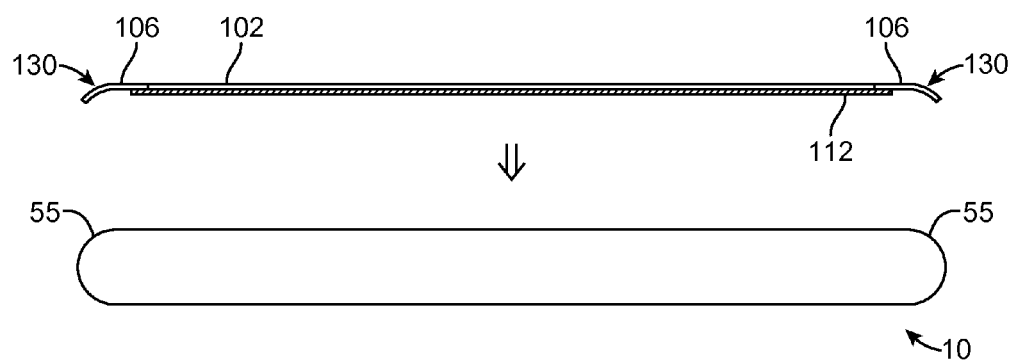
FIG. 8 is a diagram of one example of a touch screen protector for a portable electronic device according to the disclosure herein.
Figure 8A:
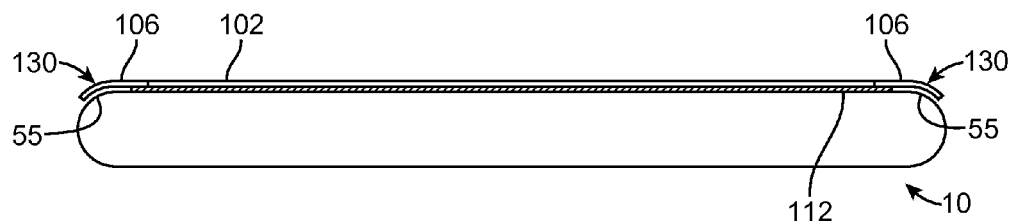
FIG. 8A is a diagram of one example of a touch screen protector for a portable electronic device according to the disclosure herein.

Referring to FIGS. 8 and 8A, the adhesive 112 can be applied across the surface between the conformable perimeter portion 106, including the glass sheet 102. In such cases, the adhesive 112 can adhere the glass sheet 102 to the touch screen portion 35 (shown in FIG. 1) of the portable electronic device 10 when placed thereon. Accordingly, in such example, the glass sheet 102 is not spaced a distance from the touch screen portion 35 but rather adhered to it.

The adhesive 112 can be made up of any type of adhesive, for example, acrylic adhesive or silicone adhesive. Accordingly, the strength of the adhesive 112 permits repeated removability, while the adhesive 112 remains adhered to the underside of glass sheet 102 (directly or indirectly) or the conformable perimeter portion 106 (directly or indirectly).

To assist in preventing or avoiding the generation of interference fringes during normal use, micro-particles (not shown) can be applied to the underside of the glass sheet 102. The micro-particles can be applied to the underside of a glass sheet 102 (or a PET layer on its underside). The underside of the glass sheet 102 is the side that is closest to the portable electronic device 10 when the touch screen protector 100 is mounted on a portable electronic device 10. The micro-particles can be printed on the underside of the glass sheet 102. The micro-particles are not in physical contact with the touch screen portion 35 (shown in FIG. 1) unless the glass touch screen protector 100 is pressed against the touch screen portion. The micro-particles can provide an anti-static effect and can quickly bounce back or pull away the glass sheet 102 from the touch screen portion 35 once it is no longer pressed against it. The micro-particles on the inner side of glass sheet 102 can be of various shapes, such as column shaped and/or wave shaped. The density of the micro-particles can be optimized such that they can be dense enough for providing anti-static effects but not too dense as to adversely affect the quality of images that are viewed through the window. A micro-particle covering can be more than 5% of the glass sheet 102 and/or the glass sheet 102. Alternatively, the micro-particles covering can be more than 8% of the glass sheet 102. Alternatively, the micro-particles covering can be more than 10% of the glass sheet 102. If desired, the entire glass sheet 102 of the protector can be covered with micro-particles, but good results can also be achieved if up to 50% of the entire glass sheet 102 is covered. The micro-particles can be made of any transparent material commonly known in the art, such as an oleophobic coating. The micro-particles can be made up of PET so that they are compatible with the glass sheet 102. In some embodiments, the glass sheet 102 of the touch screen protector 100 can include micro-particles on both sides so that the outer surface of the glass sheet 102 also does not generate static electricity during use.

Statements of the Disclosure Include:

Statement 1: A touch screen protector for a portable electronic device having a front face that includes a touch screen portion and a declining outer perimeter, the touch screen protector comprising: a glass sheet having front and back sides that corresponds in size to the touch screen portion; a conformable perimeter portion that corresponds to the declining outer perimeter of the front face of the portable electronic device; and an adhesive provided along at least a portion of the conformable perimeter portion facing the portable electronic device and having adhesive strength enabling repeated removal and reattachment; wherein the touch screen portion allows a capacitive value on the touch screen portion when touched on the glass sheet.

Statement 2: The touch screen protector as in Statement 1, wherein the conformable perimeter portion is curved to correspond to the declining outer perimeter of the front face of the portable electronic device.

Statement 3: The touch screen protector as in Statements 1 or 2, wherein the glass sheet is substantially planar, and the outer periphery of the conformable perimeter portion curves toward the underside which faces the portable electronic device when mounted.

Statement 4: The touch screen protector according to any of the preceding Statements 1 to 3, wherein the glass sheet is spaced near but not in contact with the touch screen portion, and wherein the distance between the glass sheet and the touch screen portion allows a capacitive value on the touch screen portion when touched on the glass sheet.

Statement 5: The touch screen protector according to any of the preceding Statements 1 to 4, wherein a spacer is provided along the conformable perimeter portion comprising the adhesive and having a thickness sufficient to space the glass sheet near but not in contact with the touch screen portion, and wherein the distance between the glass sheet and the touch screen portion allows a capacitive value on the touch screen portion when touched on the glass sheet.

Statement 6: The touch screen protector according to any of the preceding Statements 1 to 5, wherein the adhesive serves as a spacer having a thickness sufficient to space the glass sheet near but not in contact with the touch screen portion; and wherein the distance between the glass sheet and the touch screen portion allows a capacitive value on the touch screen portion when touched on the glass sheet.

Statement 7: The touch screen protector according to any of the preceding Statements 1 to 6, wherein the conformable perimeter portion is made up of metal, plastic, silicone, acrylic, carbon fiber, a composite, or a mixture thereof.

Statement 8: The touch screen protector according to any of the preceding Statements 1 to 7, wherein the conformable perimeter portion corresponds in size to a non-functional band of the portable electronic device.

Statement 9: The touch screen protector according to any of the preceding Statements 1 to 8, wherein the glass sheet is of sufficient rigidity so as not to flex and contact the touch screen portion when pressure is applied against the glass sheet during normal usage of the portable electronic device.

Statement 10: The touch screen protector according to any of the preceding Statements 1 to 9, wherein the glass sheet is spaced from about 0.01 mm to about 0.2 mm from the touch screen portion.

Statement 11: The touch screen protector according to any of the preceding Statements 1 to 10, wherein the adhesive comprises a silicone adhesive.

Statement 12: The touch screen protector according to any of the preceding Statements 1 to 11, which further comprises one or more alignment holes that substantially correspond to one or more buttons on the device to facilitate mounting of the protector on the device.

Statement 13: A combination comprising: a portable electronic device having a front face that includes a touch screen portion and a declining outer perimeter; and a touch screen protector mounted on the portable electronic device, the touch screen protector comprising: a glass sheet having front and back sides that corresponds in size to the touch screen portion; a conformable perimeter portion that corresponds to the declining outer perimeter of the front face of the portable electronic device; and an adhesive provided along at least a portion of the conformable perimeter portion facing the portable electronic device and having adhesive strength enabling repeated removal and reattachment; wherein the touch screen portion allows a capacitive value on the touch screen portion when touched on the glass sheet.

Statement 14: The combination as in Statement 13, wherein the conformable perimeter portion is curved to correspond to the declining outer perimeter of the front face of the portable electronic device.

Statement 15: The combination as in Statements 13 or 14, wherein the glass sheet is substantially planar, and the outer periphery of the conformable perimeter portion curves toward the underside which faces the portable electronic device when mounted.

Statement 16: The combination according to any of the preceding Statements 13 to 15, wherein the glass sheet is spaced near but not in contact with the touch screen portion, and wherein the distance between the glass sheet and the touch screen portion allows a capacitive value on the touch screen portion when touched on the glass sheet.

Statement 17: A method comprising: applying a touch screen protector to a portable electronic device having a front face that includes a touch screen portion and a declining outer perimeter, the touch screen protector comprising: a glass sheet having front and back sides that corresponds in size to the touch screen portion; a conformable perimeter portion that corresponds to the declining outer perimeter of the front face of the portable electronic device; and an adhesive provided along at least a portion of the conformable perimeter portion facing the portable electronic device and having adhesive strength enabling repeated removal and reattachment; wherein the touch screen portion allows a capacitive value on the touch screen portion when touched on the glass sheet.

Statement 18: The method as in Statement 17, wherein the glass sheet is of sufficient rigidity so as not to flex and contact the touch screen portion when pressure is applied against the glass sheet during normal usage of the portable electronic device.

Statement 19: The method as in Statements 17 or 18, wherein the glass sheet is spaced from about 0.01 mm to about 0.2 mm from the touch screen portion.

Statement 20: The method according to any of the preceding Statements 17 to 19, wherein the adhesive serves as a spacer having a thickness sufficient to space the glass sheet near but not in contact with the touch screen portion; and wherein the distance between the glass sheet and the touch screen portion allows a capacitive value on the touch screen portion when touched on the glass sheet.

The various embodiments described above are provided by way of illustration only and should not be construed to limit the scope of the disclosure. Various modifications and changes can be made to the principles and embodiments described herein without departing from the scope of the disclosure and without departing from the claims which follow.

What is claimed is:

1. A touch screen protector for a portable electronic device having a front face that includes a touch screen portion and a declining outer perimeter, the touch screen protector comprising:
    a glass sheet having front and back sides that corresponds in size to the touch screen portion;
    a conformable perimeter portion that corresponds to the declining outer perimeter of the front face of the portable electronic device, wherein the conformable perimeter portion is curved to correspond to the declining outer perimeter of the front face of the portable electronic device; and
    an adhesive provided along at least a portion of the conformable perimeter portion facing the portable electronic device and having adhesive strength enabling repeated removal and reattachment;
    wherein the touch screen portion allows a capacitive value on the touch screen portion when touched on the glass sheet.

2. The touch screen protector of claim 1, wherein the glass sheet is substantially planar, and the outer periphery of the conformable perimeter portion curves toward the underside which faces the portable electronic device when mounted.

3. The touch screen protector of claim 1, wherein the glass sheet is spaced near but not in contact with the touch screen portion, and wherein the distance between the glass sheet and the touch screen portion allows a capacitive value on the touch screen portion when touched on the glass sheet.

4. The touch screen protector of claim 1, wherein a spacer is provided along the conformable perimeter portion comprising the adhesive and having a thickness sufficient to space the glass sheet near but not in contact with the touch screen portion, and wherein the distance between the glass sheet and the touch screen portion allows a capacitive value on the touch screen portion when touched on the glass sheet.

5. The touch screen protector of claim 1, wherein the adhesive serves as a spacer having a thickness sufficient to space the glass sheet near but not in contact with the touch screen portion; and wherein the distance between the glass sheet and the touch screen portion allows a capacitive value on the touch screen portion when touched on the glass sheet.

6. The touch screen protector of claim 1, wherein the conformable perimeter portion is made up of metal, plastic, silicone, acrylic, carbon fiber, a composite, or a mixture thereof.

7. The touch screen protector of claim 1, wherein the conformable perimeter portion corresponds in size to a nonfunctional band of the portable electronic device.

8. The touch screen protector of claim 1, wherein the glass sheet is of sufficient rigidity so as not to flex and contact the touch screen portion when pressure is applied against the glass sheet during normal usage of the portable electronic device.

9. The touch screen protector of claim 1, wherein the glass sheet is spaced from about 0.01 mm to about 0.2 mm from the touch screen portion.

10. The touch screen protector of claim 1, wherein the adhesive comprises a silicone adhesive.

11. The touch screen protector of claim 1, which further comprises one or more alignment holes that substantially correspond to one or more buttons on the device to facilitate mounting of the protector on the device.

12. The touch screen protector of claim 1, wherein the conformable perimeter portion comprises metal.

13. The touch screen protector of claim 1, wherein the conformable perimeter portion comprises plastic.

14. A combination comprising:
    the portable electronic device having the front face that includes the touch screen portion and the declining outer perimeter; and
    the touch screen protector of claim 1.

15. The combination of claim 14, wherein the conformable perimeter portion is curved to correspond to the declining outer perimeter of the front face of the portable electronic device.

16. The combination of claim 14, wherein the glass sheet is substantially planar, and the outer periphery of the conformable perimeter portion curves toward the underside which faces the portable electronic device when mounted.

17. The combination of claim 14, wherein the glass sheet is spaced near but not in contact with the touch screen portion, and wherein the distance between the glass sheet and the touch screen portion allows a capacitive value on the touch screen portion when touched on the glass sheet.

18. A method comprising:
    applying the touch screen protector of claim 1 to the portable electronic device having the front face that includes the touch screen portion and the declining outer perimeter.

19. The method of claim 18, wherein the glass sheet is of sufficient rigidity so as not to flex and contact the touch screen portion when pressure is applied against the glass sheet during normal usage of the portable electronic device.

20. The method of claim 18, wherein the glass sheet is spaced from about 0.01 mm to about 0.2 mm from the touch screen portion.

21. The method of claim 18, wherein the adhesive serves as a spacer having a thickness sufficient to space the glass sheet near but not in contact with the touch screen portion; and wherein the distance between the glass sheet and the touch screen portion allows a capacitive value on the touch screen portion when touched on the glass sheet.

* * * * *